US006833151B2

United States Patent
Takahashi et al.

(10) Patent No.: US 6,833,151 B2
(45) Date of Patent: Dec. 21, 2004

(54) PECTINS, PROCESS FOR PRODUCING THE SAME, ACIDIC PROTEIN FOODS WITH THE USE OF THE SAME AND PROCESS FOR THE PRODUCTION THEREOF

(75) Inventors: Taro Takahashi, Ibaraki (JP); Hitoshi Furuta, Ibaraki (JP); Junko Tobe, Ibaraki (JP)

(73) Assignee: Fuji Oil Co., Ltd., Osaka (JP)

( * ) Notice: Subject to any disclaimer, the term of this patent is extended or adjusted under 35 U.S.C. 154(b) by 190 days.

(21) Appl. No.: 10/049,570

(22) PCT Filed: May 2, 2001

(86) PCT No.: PCT/JP01/03812

§ 371 (c)(1),
(2), (4) Date: Feb. 14, 2002

(87) PCT Pub. No.: WO01/96405

PCT Pub. Date: Dec. 20, 2001

(65) Prior Publication Data

US 2002/0176922 A1 Nov. 28, 2002

(30) Foreign Application Priority Data

Jun. 15, 2000 (JP) ........................................ 2000-179220

(51) Int. Cl.$^7$ ............................................. A23L 1/0524
(52) U.S. Cl. ........................ 426/577; 426/618; 426/637
(58) Field of Search ................................ 426/577, 594, 426/618, 637

(56) References Cited

U.S. PATENT DOCUMENTS

2003/0159178 A1 * 8/2003 Ulvskov et al.

FOREIGN PATENT DOCUMENTS

| EP | 0958746 | 11/1999 |
| EP | 1069138 | 1/2001 |
| WO | WO 97/49298 | * 12/1997 |
| WO | WO 99/03892 | * 1/1999 |
| WO | WO 00/40098 | 7/2000 |

* cited by examiner

Primary Examiner—Anthony Weier
(74) Attorney, Agent, or Firm—Paul & Paul

(57) ABSTRACT

There are provided high quality pectins obtained by extraction from root vegetables, a process for their production, acidic protein foods that are stable in an acidic pH range above the isoelectric point of their proteins and are obtained using the pectins, and a process for their production. By adding an emulsifier during extraction of pectins from root vegetables for insolubilization of the starch impurities for their separation and removal, it is possible to produce highly pure pectins, which may be used to obtain acidic protein foods of satisfactory quality.

5 Claims, No Drawings

PECTINS, PROCESS FOR PRODUCING THE SAME, ACIDIC PROTEIN FOODS WITH THE USE OF THE SAME AND PROCESS FOR THE PRODUCTION THEREOF

TECHNICAL FIELD

The present invention relates to pectins, to a process for their production, to acidic foods employing them and to a process for their production, and more specifically it relates to pectins obtained from root vegetables, and particularly tubers and corms, to a process for their production, to acidic foods such as acidic protein beverages obtained by adding citrus or other juices, organic acids or inorganic acids to protein beverages such as milk and soy milk, or acidic milk beverages, acidic frozen desserts and acidic desserts, as well as coffee beverages, lactic acid bacteria beverages, fermented milk, liquid yogurt and the like, and to a process for their production.

BACKGROUND ART

Root vegetables, and particularly tubers and corms, have long been known to contain starches and pectins (Ullmanns Enzyklopaedie der techn. Chemie, Bd. 13, 171, Urban & Schwarzenberg, Muenchen-Berlin (1962)), and they have been the subject of much research as production starting materials for pectins (Die Staerke 26 (1974) 12, 417–421, CCB 3, 1 (1978) 48–50, Getreide Mehl und Brot 37, 5 (1983) 131–137, Japanese Unexamined Patent Publication No. 60-161401, Chem. Eng. Technol. 17 (1994) 291–300, WO97/49298). Research has also been conducted in the past on their uses, mainly as gelling agents (ZSW Bd. 31 (1978) H.9 348–351, Getreide Mehl und Brot 37, 5 (1983) 131–137, WO97/49298).

As mentioned above, production of pectins from 35 tubers and corms has long been the subject of study as a research topic. However, in terms of its function as a gelling agent for jams and the like that has been examined as its major use, it has not excelled over pectin derived from fruits such as apples or citrus fruits, and its use has therefore not been practical to date. In addition, while uses and production processes for fruit-derived pectins have been investigated in depth, it is currently the situation that virtually no research has been carried out on the characteristic function of pectins obtained from root vegetables, and particularly tubers and corms, and on establishing the detailed production conditions.

For production of acidic protein foods it has been common in the past to use apple and citrus-derived pectins, water-soluble soybean polysaccharides, carboxymethylcellulose sodium, alginic acid propylene glycol aster and the like for the purpose of preventing agglutination and sedimentation of protein particles. However, for most stabilizers that are used, the pH range suited for satisfactory stabilization of protein dispersion is below the isoelectric point of the protein, and stabilizers have been desired which can stabilize acidic protein foods in a pH range above the isoelectric point.

On the other hand, it has been reported that protein components can be stabilized in the slightly acidic pH range from neutral to pH 5.2 by addition of organic acid salts (Japanese Examined Patent Publication No. 5-52170), but this technique entails problems such as loss of milkiness of the stabilized protein solution, and inability to achieve satisfactory acidity by the effect of the added organic acid salt.

In addition, milk proteins in acidic milk beverages such as liquid yogurt, lactic acid bacteria beverages or fruit milk are highly unstable and agglutinate, and time leads to sedimentation of the milk proteins and separation of the whey. Such agglutination occurs to a considerable degree during sterilization heating, resulting in total loss of product value.

Milk-added coffee that can be distributed at ordinary temperature has conventionally been made by mixing and dissolving raw materials such as coffee extract, milk components, sugars, emulsifiers and the like to make coffee compositions, and then subjecting them to a homogenizer and to a heating step at 110–135° C. for sterilization either before or after being packed into storage containers; however, the high temperature of the heating step produces a decomposition reaction of the coffee components, and lowers the pH of the coffee solution. When the pH of the solution is lowered to acidity of under pH 6.0, the milk proteins in the milk components of the coffee solution are denatured, causing separation and agglutination, and destroying the product value. In order to prevent denaturation of the milk proteins, alkali substances such as sodium bicarbonate have been preadded to the coffee solution to adjust the pH of the coffee solution to above 6.5 before heating, but since the milk-added coffee produced by such methods is heated for sterilization at a pH of above 6.5, the coffee aroma is altered such that it exhibits the unique aroma and flavor of "retort canned coffee", which is different from the original regular coffee.

On the other hand, there has been a strong demand for development of heat sterilized milk-added coffee beverages that can be stored at ordinary temperature and exhibit excellent acidic flavor, and as production methods for acidic milk component-added coffee beverages there have been proposed a method of using fresh cream or butter as the milk component and adding an emulsifier such as sucrose fatty acid ester and crystalline cellulose (Japanese Unexamined Patent Publication No. 6-245703) and a method of stabilizing the milk proteins using acidic polysaccharides (Japanese Unexamined Patent Publication No. 62-74241); however, neither of these methods has succeeded in stabilizing the milk components without impairing the unique flavor and properties of the coffee.

Thus, while coffee normally exhibits the characteristic flavor and acidity of regular coffee in the weakly acidic pH range of 6,5 and below, when the pH of the coffee solution is adjusted to above 6.5 during preparation the characteristic flavor and acidity of regular coffee is lost, and the coffee obtained by heat sterilization has therefore had greatly reduced flavor compared to the original regular coffee. That is no technique has existed allowing prolonged stabilization of milk components without impairing the flavor and properties characteristic of regular coffee.

Thus, although techniques have existed for stabilization of protein dispersion in the pH range below the isoelectric point and from pH 5.2 to neutral, no technique has existed allowing satisfactory stabilization of acidic protein foods in the general pH range of higher acidity than the isoelectric point of the proteins.

DISCLOSURE OF THE INVENTION

It is an object of the present invention to provide a pectin obtained by extraction from root vegetables and particularly tubers and corms and a process for its production, as well as acidic protein foods that are stable in the pH range above the isoelectric point of the proteins and a process for their production, and to provide heat sterilized milk-added beverages that can be distributed at ordinary temperature, wherein the milk components are stable for long periods. Here, "acidity" refers to the pH range of 6.5 and lower.

As a result of diligent research directed toward solving the problems described above, the present inventors have found that pectins obtained by hot water extraction under weakly acidic conditions from starch residue as a processing by-product of tubers and corms exhibit a characteristic function, and particularly that the use of potato-derived pectins can satisfactorily stabilize acidic protein foods in a pH range above the isoelectric point of the proteins at a lower viscosity than with fruit-derived pectins. Upon continued research subsequent to filing of Japanese Patent Applications No. 11-9984 and No.11-249464, it was further found that by using an emulsifier during extraction of the pectins it is possible to efficiently minimize or eliminate elution of starch contaminants in the starch residue. The present invention has been completed on the basis of these findings.

In other words, the invention relates to a process for production of pectins comprising adding an emulsifier during extraction of pectins from root vegetables and separating and removing the insolubles that are produced, as well as to pectins produced by the process, to a process for production of acidic protein foods comprising using the pectins, and to acidic protein foods produced by the process.

BEST MODE FOR CARRYING OUT THE INVENTION

Examples of root vegetables as raw materials for extraction of pectins according to the invention include tubers and corms such as potatoes, sweet potatoes, taros, yams and devil's tongue root, as well as burdocks, carrots, radishes, lotus roots, beets and the like, among which tubers and corms are particularly preferred. Such tubers and corms can be used either in raw or dried form, but preferably the raw or dried starch residue produced as a processing by-product of starch industry is used, and such starch residue from potatoes is readily available.

The extraction of pectins from the raw material is preferably carried out under weak acidity from pH 3.8 to pH 5.3. Pectins extracted outside of this pH range tend to not as easily exhibit a dispersion stabilizing function for proteins in the pH range above their isoelectric points.

Incidentally, while the reason why pectins extracted in this pH range exhibit the function described above is not completely understood, it is believed that the degree of esterification of the polygalacturonic chains in the extracted pectins and the stereostructure of the neutral sugar chains are probable contributing factors.

The pectin extraction temperature in the aforementioned pH range is preferably 100° C. or above. When the extraction is carried out at a temperature below 100° C., time is required for elution of the pectins and the process is economically unfeasible. On the other hand, while extraction is completed in a shorter time with increasing temperature, an excessively high temperature will have an adverse effect on the flavor and color while also promoting low molecularization of the pectins, thus lowering the function-exhibiting effect, and therefore the extraction is preferably carried out at no higher than 130° C.

The pectins according to the invention exhibit an even stronger effect if the contaminating starch is Am maximally removed to increase the purity. (The contaminating starch is preferably no greater than 60% and more preferably no greater than 50% as the content measured by quantitation using iodine.) The starch may be removed by, for example, decomposition with enzymes, washing removal from the raw material with water at 100° C. or below, or separation of the insoluble portion in the extract; according to the invention, however, using an emulsifier allows removal of the starch in an easy and effective manner. Specifically, an emulsifier is added to the extracted raw material solution for insolubilization of the starch, so that the insoluble portion can be separated and removed from the extract. Thus, it may also be accomplished by adding the emulsifier to the pectin extract after extraction of the pectin and separating and likewise removing the insolubilized portion with means such as a centrifugal separator, and the emulsifier may be added at any stage during, before or after extraction of the pectin. Pectin with any molecular weight value may be used, but it preferably has an average molecular weight of a few tens of thousands to a few million, and specifically from 50,000 to 300,000. The average molecular weight of the pectin is the value determined by the limiting viscosity method whereby the viscosity is measured in a 0.1 molar $NaNO_3$ solution using standard pullulan (Showa Denko Co., Ltd.) as the standard substance.

The emulsifier used for the invention preferably has a hydrophilicity with an HLB value of 5.5 or greater, and more preferably an HLB value of 10–19.

The emulsifier used for the invention also preferably has a hydrophobic fatty acid carbon chain length of C12 or greater. Specifically, the carbon number of the main constitutional fatty acid of the emulsifier is preferably 12–26.

The amount of emulsifier used may be 0.2–10 wt % and preferably about 0.5–5 wt % based on the solid (for example, starch residue) of the extracted raw material as a general standard, but since this may vary according to differences in the starch concentration, the amount used does not restrict the scope of the invention.

The pectins derived from root vegetables and particularly tubers and corms, which are obtained according to the invention, have a characteristic function differing from conventional pectins derived from fruits such as apples and citrus fruits. Specifically, whereas fruit-derived pectins are used as stabilizers for acidic milk beverages by utilizing their function that can stabilize dispersion of proteins in a pH range below their isoelectric point, the pectin according to the invention has a function that can stabilize dispersion of proteins in a pH range above the isoelectric point, and this function allows production of acidic protein foods that are stable in a pH range above the isoelectric point, which have not been obtainable by the prior art.

An acidic protein food according to the invention is an acidic food containing animal or vegetable protein, and the term includes acidic protein foods such as acidic protein beverages obtained by adding citrus or other juices, organic acids such as citric acid or lactic acid or inorganic acids such as phosphoric acid to protein beverages containing animal or vegetable proteins, such as milk and soy milk, acidic milk beverages obtained by acidifying dairy products, acidic frozen desserts such as acidic ice cream, frozen yogurt and the like obtained by adding fruit juice to frozen desserts containing milk components such as ice cream, acidic desserts obtained by adding fruit juice or the like to gelled foods such as puddings and Bavarian cream, as well as coffee beverages, lactic acid bacteria beverages (including live bacteria and pasteurized types) and fermented milk (solid and liquid types). Animal or vegetable proteins include cow milk, goat milk, skim milk, soybean milk, and whole milk powder or skim milk powder obtained by powdering these, as well as sugar-added milk, condensed milk, processed milk obtained by fortification with minerals such as calcium or vitamins, fermented milk, and the proteins obtained from the same. Fermented milk refers to fermented milk obtained by addition of a lactic acid bacteria starter and fermentation after sterilization of the animal or vegetable proteins, and it may be further powdered sugar may be added thereto as desired.

The amount of pectin used for the invention may be 0.05–10 wt % and preferably about 0.2–2 wt % based on the final product as a general standard, but since this may vary according to differences in the protein concentration, the amount used does not restrict the scope of the invention.

For production of an acidic protein food according to the invention there may also be used in combination conventional stabilizers such as apple and citrus-derived pectins, water-soluble soybean polysaccharides, carboxymethylcellulose sodium, alginic acid propyleneglycol ester, carrageenan, fine crystalline cellulose, chitosan, organic acid salt, heavy phosphoric acid salts, emulsifiers, heat-denatured proteins and the like, which can increase the stable pH range.

EXAMPLES

Examples are provided below for a more detailed explanation of the preferred mode of the invention, with the understanding that they are exemplary and are not intended to restrict the spirit of the invention. The "parts" and "%" values in the examples are based on weight.

Experimental Example

After suspending 4 g of dried purified potato starch (Merck Co.) in 396 g of water, the suspension was heated in an autoclave at 120° C. for 30 minutes to prepare a 1% solution of potato starch. Separately there were prepared 0.1% solutions of different emulsifiers, and these were dispensed at 3 ml each into screw capped test tubes. The starch solution prepared previously was added in an equal amount to each emulsifier solution, and the tubes were held for 1.5 hours at temperatures of 50° C., 80° C. and 110° C. After heating, they were cooled to room temperature and subjected to centrifugal separation at 2000 g×20 minutes, after which the starch content of the supernatant was measured and the starch insoluble proportion was calculated for each emulsifier. The starch content was measured by absorption at OD 600 nm using the iodine coloration method with a 0.2% (W/V) $I_2$/2% (W/V) KI solution, and the starch insoluble proportion (%) was calculated as 100−(starch concentration of supernatant after emulsifier treatment)/(starch concentration of supernatant without emulsifier and before heating)×100. A list of the emulsifiers used and the results of calculating the starch insoluble proportions are shown in Tables 1 and 2, respectively.

TABLE 1

| Product Name | HLB | Type | Raw fat/oil (fatty acid) |
|---|---|---|---|
| POEM K-30 | 3.0 | monoglyceride citrate | stearic acid-based |
| RIKEMARRU FF-100 | 3.7 | PG ester | palmitic acid-based |
| EMULSI MS | 4.3 | high-purity monoglyceride | stearic acid-based |
| EMULSI P-100 | 4.3 | high-purity monoglyceride | 53% stearic acid, 47% palmitic acid |
| POEM P-10 | 5.5 | monoglyceride succinate | stearic acid-based |

TABLE 1-continued

| Product Name | HLB | Type | Raw fat/oil (fatty acid) |
|---|---|---|---|
| C-LR10 | 6.0 | monoglyceride citrate | oleic acid-based |
| POEM W-10 | 9.5 | diacetyl monoglyceride tartrate | stearic acid-based |
| SANLECITHIN S | 10–12 | enzymolytic lecithin | soybean oil |
| MO 750 | 12.9 | decaglycerin monoester | oleic acid-based |
| MSW 750 | 13.4 | decaglycerin monoester (purity 40%) | stearic acid-based |
| ML 750 | 14.8 | decaglycerin monoester | lauric acid-based |
| DK ESTER F-160 | 15.0 | sucrose fatty acid ester | stearic acid-based monoester |
| F-1670 | 16.0 | sucrose fatty acid ester | palmitic acid-based monoester |
| MCA 750 | 16.0 | decaglycerin monoester | caprylic acid-based |
| DK ESTER F-33 | 19.0 | sucrose fatty acid ester | stearic acid-based monoester (monoester purity: 100%) |

TABLE 2

Insolubilization of starch by each emulsifier (%)

|  | 50° C. | 80° C. | 110° C. |
|---|---|---|---|
| Not added | 3.4 | 0.1 | −4.3 |
| POEM K-30 | 2.0 | 7.7 | 3.1 |
| RIKEMARU PP-100 | 2.4 | 6.8 | −1.8 |
| EMULSI MS | −2.4 | −1.1 | 1.0 |
| EMULSI P100 | 1.3 | 8.1 | 2.0 |
| POEM B-10 | 5.2 | 15.0 | 13.2 |
| C-LR10 | 11.5 | 18.3 | 8.6 |
| POEM W-10 | 17.4 | 28.6 | 23.7 |
| SANLECITHIN S | 26.4 | 30.3 | 34.6 |
| MO 750 | 16.9 | 25.8 | 19.4 |
| MSW 750 | 5.4 | 12.9 | 14.6 |
| ML 750 | 8.9 | 18.3 | 14.9 |
| DK ESTER F-160 | 32.0 | 42.1 | 33.4 |
| P-1670 | 38.5 | 45.1 | 36.0 |
| MCA 750 | −3.7 | 3.8 | 0.3 |
| DK ESTER F-SS | 47.5 | 50.7 | 61.2 |

As shown by the above results, by application of heat treatment at 50° C. or higher using emulsifiers with HLB values of 6 or greater and main structural fatty acid carbon numbers of 12 or greater, over 10% of the soluble starch was insolubilized and sedimented. Even when the HLB value was 5.5 or greater, application of heat treatment at 80° C. or higher resulted in insolubilization and sedimentation of over 10% of the soluble starch. On the other hand, no insolubilized sedimentation of starch was resulted by application of heat treatment when using an emulsifier with a main structural fatty acid carbon number of 10 or smaller, even when the HLB value was 6 or greater.

Example 1

Preparation of Pectin (A)

After suspending 50 g of non-purified dried potato starch residue (moisture content: 10', starch content (in solid portion): 36') in 950 g of water, 1.8 g of a sucrose fatty acid ester with an HLB value of 16 (trade name: RYOTO SUGAR ESTER P-1670, product of Mitsubishi-.Kagaku Foods Corp.) was added, the pH was adjusted to 4.5 with hydrochloric acid, and the mixture was heated at 110° C. for 90 minutes to extract the crude pectin. After cooling, centrifugal separation (10,000 g+30 minutes) was carried out to separate the pectin extract and sediment portion. The separated sediment portion was again subjected to centrifugal separation after addition of an equivalent weight of water, and after combining the supernatant with the previously obtained pectin extract, the mixture was dried to obtain pectin (A).

Example 2
Preparation of Pectin (B)

After suspending 50 g of non-purified dried potato starch residue (moisture content: 10%, starch content (in solid portion): 36%) in 950 g of water, the pH was adjusted to 4.5 with hydrochloric acid, and the mixture was heated at 110° C. for 90 minutes to extract the crude pectin. After cooling, centrifugal separation (10,000 g×30 minutes) was carried out to separate the pectin extract and sediment portion. The separated sediment portion was again subjected to centrifugal separation after addition of an equivalent weight of water, and after combining the supernatant with the previously obtained pectin extract, the pH of the obtained crude pectin solution was adjusted to 7.0, and then 1.0 g of enzymolytic soybean lecithin with an HLB value of 12 (trade name: SUN LECITHIN A, product of Taiyo Kagaku Co., Ltd.) was added and allowed to act at 80° C. for 1 hour. After completion of the reaction, the pH was readjusted to 4.5, centrifugal separation was conducted at 10,000 g×10 minutes, and the insolubilized starch was removed prior to drying to obtain pectin (B).

Example 3
Preparation of Pectin (C)

After suspending 50 g of non-purified dried potato starch residue (moisture content. 10%, starch content (in solid portion): 36%) in 950 g of water, 1.0 g of a sugar ester with an HLB value of 19 (trade name: DK ESTER F-SS, product of Daiichi Kogyo Pharmaceutical Co., Ltd.) was added, the pH was adjusted to 4.5 with hydrochloric acid, and the mixture was heated at 110° C. for 90 minutes to extract the crude pectin. After cooling, centrifugal separation (10,000 g×30 minutes) was carried out to separate the pectin extract and sediment portion. The separated sediment portion was again subjected to centrifugal separation after addition of an equivalent weight of water, and after combining the supernatant with the previously obtained pectin extract, 0.5 g of a polyglycerin fatty acid ester with an HLB value of 14.8 and a main structural fatty acid carbon number of 12 (trade name: SY-GLYSTAR ML-750, product of Sakamoto Pharmaceutical Industry Co., Ltd.) was added to the obtained crude pectin solution and allowed to act at 50° C. for 1.5 hours. After completion of the reaction, the pH was readjusted to 4.5, centrifugal separation was conducted at 10,000 g×10 minutes, and the insolubilized starch was removed prior to drying to obtain pectin (C).

Example 4
Preparation of Pectin (D)

Pectin obtained in the same manner as Example 3 was subjected to purification treatment by passing through an active carbon column and was then dried to obtain pectin (D).

The analysis results for each of the obtained pectins are summarized in Table 3 below. The total sugars were measured by the phenol sulfate method, the uronic acid was measured by the Blumenkrantz method and the starch content was measured by the iodine coloration method. The average molecular weight is the value determined by the limiting viscosity method whereby the viscosity is measured in a 0.1 molar $NaNO_3$ solution using standard pullulan (Showa Denko Co., Ltd.) as the standard substance.

TABLE 3

| Component | Compositions (%) | | | |
|---|---|---|---|---|
| | Example 1 (A) | Example 2 (B) | Example 3 (C) | Example 4 (D) |
| Moisture | 5.5% | 5.2% | 4.5% | 3.8% |
| Crude ash | 4.2% | 4.4% | 3.5% | 4.4% |
| Total sugars | 86.3% | 90.9% | 87.8% | 89.4% |
| Uronic acid | 23.2% | 22.0% | 24.1% | 24.6% |
| Starch | 20.9% | 29.6% | 18.9% | 22.6% |
| Average molecular weight | 129,000 | 142,000 | 128,000 | 134,000 |

Example 5

The obtained pectins (A) to (D) were used for evaluation of the protein dispersion stabilizing function at pH 5.0, with the composition shown in Table 4 below.

TABLE 4

| Pectin solution | (1% solution) | 20 parts |
|---|---|---|
| Sugar solution | (35% solution) | 10 parts |
| Cow milk | | 20 parts |
| Citric acid solution | prepared at pH 5.0 with citric acid solution | (50% solution) |

After mixing 20 parts of the 1% pectin solution, 10 parts of the 35% sugar solution and 20 parts of cow milk while cooling, a 50% citric acid solution was added dropwise to adjust the pH to 5.0, and upon observation of the state, all the solutions exhibited satisfactory dispersion stability.

Comparative Example 1

After suspending 50 g of non-purified dried potato starch residue (moisture content; 10%, starch content (in solid portion): 36%) in 950 g of water, the pH was adjusted to 4.5 with hydrochloric acid, and the mixture was heated at 110° C. for 90 minutes to extract the crude pectin. After cooling, centrifugal separation (10,000 g×30 minutes) was carried out to separate the pectin extract and sediment portion. The separated sediment portion was again subjected to centrifugal separation after addition of an equivalent weight of water, and after combining the supernatant with the previously obtained pectin extract, the mixture was dried and the crude pectin (starch content (in solid portion): 72%) was recovered. The recovered crude pectin was used for confirmation of the protein dispersion stabilizing function at pH 5.0 in the same manner as Example 1, but coagulation was found in the acidified milk and the dispersion stability was therefore unsatisfactory.

Example 6

After suspending 1 kg of non-purified dried potato starch residue (moisture content: 10%, starch content (in solid portion): 36%) in 19 kg of water, 36 g of a sucrose fatty acid ester with an HLB value of 16 (trade name: RYOTO SUGAR ESTER P-1670, product of Mitsubishi-Kagaku Foods Corp.) was added, and the pectin was extracted in the same manner as Example 1. The pectin extract was spray dried to obtain a crude pectin, which was used as a stabilizer for evaluation of the protein dispersion stabilizing function at different pH levels with the composition shown in Table 5 below.

TABLE 5

| Stabilizer solution | (1% solution) | 20 parts |
|---|---|---|
| Sugar solution | (35% solution) | 10 parts |
| Powdered skim milk | (8% solution) | 20 parts |
| Citric acid solution | prepared at pH 4.0–6.5 with citric acid solution | (50% solution) |

After mixing 20 parts of the 1% pectin solution, 10 parts of the 35% sugar solution and 20 parts of 8% powdered skim milk solution while cooling, a 50% citric acid solution was added dropwise to adjust the pH to 4.0, 4.3, 4.5, 4.8, 5.0, 5.3, 5.5, 5.8, 6.0 and 6.5, after which a homogenizer was used for homogenization at 150 kgf/cm$^2$ to make acidic milk beverages. The evaluation of each of the acidic milk beverages is summarized in Table 6 below.

TABLE 6

| Acidic milk beverage pH | Viscosity (mPa.s) | State |
|---|---|---|
| pH 4.0 | 5.9 | notable coagulation |
| pH 4.3 | 5.2 | coagulation |
| pH 4.5 | 4.6 | slight coagulation |
| pH 4.8 | 3.5 | stable |
| pH 5.0 | 2.9 | stable |
| pH 5.3 | 2.5 | stable |
| pH 5.5 | 2.7 | stable |
| pH 5.8 | 2.4 | stable |
| pH 6.0 | 2.4 | stable |
| pH 6.5 | 2.2 | stable |

As shown in Table 6, the acidic milk beverages obtained using as the stabilizer potato starch residue-derived pectin with minimized elution of or insolubilization and elimination of the contaminating starch through the use of an emulsifier during production were confirmed to exhibit a protein dispersion stabilizing function at low viscosity in the general acidic pH range above pH 4.6 as the isoelectric point of milk protein.

Comparative Example 2

The stability of acidic milk beverages was evaluated at different pH levels in the same manner as Example 6, except that the stabilizer used was apple-derived commercially available pectin (trade name: CLASSIC AM201, product of Dainippon Pharmaceutical Co., Ltd.). The evaluation results are summarized in Table 7 below.

TABLE 7

| Acidic milk beverage pH | Viscosity (mPa.s) | State |
|---|---|---|
| pH 4.0 | 7.8 | stable |
| pH 4.3 | 8.8 | stable |
| pH 4.5 | 9.0 | slight coagulation |
| pH 4.8 | 9.5 | coagulation |
| pH 5.0 | 10.1 | notable coagulation |
| pH 5.3 | 9.6 | notable coagulation |
| pH 5.5 | 9.7 | notable coagulation |
| pH 5.8 | 9.4 | notable coagulation |
| pH 6.0 | 9.5 | notable coagulation |
| pH 6.5 | 9.5 | notable coagulation |

As shown in Table 7, the acidic milk beverages obtained using apple-derived commercially available pectin as the stabilizer exhibited no protein dispersion stabilizing function in the acidic pH range above pH 4.6 as the isoelectric point of milk protein. Even when dispersion of the milk protein was stabilized at pH 4.5 and below, the viscosity was high and the texture was muddy and pasty.

Comparative Example 3

The stability of acidic milk beverages was evaluated at different pH levels in the same manner as Example 6, except that the stabilizer used was commercially available trisodium citrate (Kishida Kagaku Co., Ltd.). The evaluation results are summarized in Table 8.

TABLE 8

| Acidic milk beverage pH | Viscosity (mPa.s) | State |
|---|---|---|
| pH 4.0 | 3.9 | notable coagulation |
| pH 4.3 | 5.2 | notable coagulation |
| pH 4.5 | 5.5 | notable coagulation |
| pH 4.8 | 4.4 | notable coagulation |
| pH 5.0 | 2.9 | notable coagulation |
| pH 5.3 | 2.6 | slight coagulation |
| pH 5.5 | 1.8 | stable (clear) |
| pH 5.8 | 1.7 | stable (clear) |
| pH 6.0 | 1.7 | stable (clear) |
| pH 6.5 | 1.7 | stable (clear) |

As shown in Table 8, the acidic milk beverages obtained using commercially available trisodium citrate as the stabilizer exhibited a protein dispersion stabilizing function in the acidic pH range above pH 5.3, but the stabilized acidic milk beverages lacked milkiness and thus had lost product value as milk beverages.

Preparation of Milk Coffee Beverages (Examples 7–9, Comparative Example 4)

After extracting 500 g of ground medium roasted Colombian coffee bean powder with 5 liters of hot water, it was cooled to below 25° C. to obtain 4.5 liters of coffee extract. A sugar-mixed solution was obtained by dissolving 700 g of granular sugar and 3 g of sucrose fatty acid ester in 1.3 liters of purified water. The coffee extract, sugar-mixed solution, a 3% pectin (A) solution and water were combined according to the composition shown in Table 9 below, and after adjusting the total to 1.8 liters, cow milk was slowly added to make a total of 2 liters. After mixing the entire amount, sodium bicarbonate or L-ascorbic acid was used for adjustment to pH 7.0, 6.0 and 5.0, and then homogenization was carried out under conditions of 150 kg/cm$^2$ to prepare milk coffee beverages. The prepared milk coffee beverages were retort sterilized at 121° C. for minutes, and the heat stability of the milk protein dispersion stabilizing effect of the pectin of the invention was evaluated.

TABLE 9

| | Compositions (%) | | | |
|---|---|---|---|---|
| | Example 7 | Example 8 | Example 9 | Comp. Ex. 4 |
| Pectin solution (3% solution) | 400 parts | ← | ← | 0 |
| Coffee extract | 800 parts | ← | ← | ← |
| Sugar mixture solution | 400 parts | ← | ← | ← |
| Purified water | 200 parts | ← | ← | 600 parts |
| Milk | 200 parts | ← | ← | ← |
| Preparation pH | 7.0 | 6.0 | 5.0 | 6.0 |

The prepared milk coffee beverages were heated to 95° C. with a plate heater and filled into empty cans which were then screwed shut to obtain canned milk coffee beverages, and these were placed in a retort boiler for retort sterilization under conditions of 121° C. for 30 minutes to obtain milk coffee beverage products. The evaluation results for the canned milk coffee beverages obtained in the examples and comparative example are shown in Table 10. The table row listed as "Evaluation after storage in hot vendor" indicates the visually observed state of sedimentation after the milk coffee beverages obtained in the examples and comparative example were allowed to stand for 4 weeks in a thermostatic zone at 60° C. and the contents were then transferred from the can to a beaker The evaluation of "coagulation" in the rows listed as "Evaluation after retort sterilization" and "Evaluation after storage in hot vendor" indicates that milk protein sedimentation and fat separation were found. An organoleptic test was conducted to check the acidity and flavor of the obtained milk coffee beverages. For the organoleptic test, a taste test was conducted by 15 panelists (male:female=10:5, age group 20s:30s:40s=6:7:2) who scored the beverages based on regular coffee aroma and acidity, assigning +2 points for "very excellent", 0 points for "ordinary" and −2 points for "very poor", and the average values were calculated.

TABLE 10

|  | Example 7 | Example 8 | Example 9 | Comp. Ex. 4 |
|---|---|---|---|---|
| Evaluation after retort sterilization |  |  |  |  |
| pH | 6.4 | 5.3 | 4.9 | 5.3 |
| Stability | stable | stable | stable | coagulation |
| Organoleptic test (aroma, acidity) | lacking in flavor | satisfactory | slightly strong acidity | no product value |
| Organoleptic test (points) | 0.7 | 1.8 | 1.2 | — |
| Evaluation after storage in hot vendor |  |  |  |  |
| Stability | stable | stable | stable | — |

As shown in Table 10, the milk-added coffee prepared without using the pectin of the invention (Comparative Example 4) exhibited separation and sedimentation of the milk components after retort sterilization, and the resulting milk-added coffee beverage had no product value. In contrast, when pectin (A) according to the invention was used, no coagulated separation of milk protein was found in a wide pH range even after retort sterilization at 121° C. for 30 minutes, thus confirming excellent heat stability.

Industrial Applicability

According to the present invention it was found that using an emulsifier during production of root vegetable-derived pectins can efficiently minimize elution of or insolubilize and eliminate the contaminating starch. It was also found that pectins extracted at high temperature from root vegetables, and particularly tubers and corms, under weakly acidic conditions have a characteristic function differing from conventional stabilizers, which is a protein dispersion stabilizing function in an acidic pH range above the isoelectric point. This function can be utilized to produce acidic protein foods which are stable in an acidic pH range above the isoelectric point and which have not been obtainable by the prior art. The produced acidic protein foods can also be kept in a stable state even after heating such as retort sterilization.

What is claimed is:

1. A process for production of pectins comprising adding an emulsifier during extraction of pectin from a root vegetable, the addition of pectin producing insoluble matter, the emulsifier including a main constitutional fatty acid having a carbon number, and separating and removing the insoluble matter that is produced.

2. The process according to claim 1, wherein the HLB value of the emulsifier is 5.5 or greater.

3. The process according to claim 1 or 2, wherein the carbon number of the main constitutional fatty acid of the emulsifier is 12 or greater.

4. The process according to any one of claims 1 to 2, wherein the root vegetable is a tuber or corn.

5. The process according to claim 4, wherein the tuber or corn is a potato.

* * * * *